(12) United States Patent
Friedrich et al.

(10) Patent No.: US 7,495,933 B2
(45) Date of Patent: Feb. 24, 2009

(54) RESONANCE TRANSDUCER

(75) Inventors: Heiner Friedrich, Lobenstein (DE); Bernd Pfeifer, Liebschutz (DE)

(73) Assignee: Puls GmbH, Munich (DE)

( * ) Notice: Subject to any disclaimer, the term of this patent is extended or adjusted under 35 U.S.C. 154(b) by 504 days.

(21) Appl. No.: 11/185,550

(22) Filed: Jul. 20, 2005

(65) Prior Publication Data

US 2006/0039170 A1 Feb. 23, 2006

(30) Foreign Application Priority Data

Jul. 21, 2004 (DE) .................... 10 2004 035 248

(51) Int. Cl.
*H02M 3/335* (2006.01)
*H02M 3/24* (2006.01)
*H02M 7/44* (2006.01)

(52) U.S. Cl. .................... 363/17; 363/98; 363/131; 363/132

(58) Field of Classification Search ............ 363/17, 363/98, 131, 132
See application file for complete search history.

(56) References Cited

U.S. PATENT DOCUMENTS

| 4,495,555 | A | * | 1/1985 | Eikelboom ............ 363/28 |
| 6,246,599 | B1 | | 6/2001 | Jang et al. |
| 6,400,590 | B2 | * | 6/2002 | Hickman ............ 363/65 |
| 6,535,399 | B2 | * | 3/2003 | Gu ............ 363/17 |
| 2002/0126515 | A1 | | 9/2002 | Boeke |
| 2002/0181259 | A1 | | 12/2002 | Duerbaum et al. |
| 2003/0035304 | A1 | * | 2/2003 | Gu ............ 363/17 |
| 2003/0147263 | A1 | | 8/2003 | Ribarich |

FOREIGN PATENT DOCUMENTS

| DE | 92 16 426 U1 | 4/1993 |
| DE | 100 60 169 A1 | 6/2002 |
| DE | 101 09 967 A1 | 9/2002 |
| EP | 1 303 032 A2 | 9/2002 |

OTHER PUBLICATIONS

Lee et al. "An Improved Full-Bridge Zero-Voltage-Transition PWM DC/DC Converter with Zero-Voltage/Zero-Current Switching of the Auxiliary Switches," *IEEE*, pp. 816-822, 1998.

* cited by examiner

*Primary Examiner*—Bao Q Vu
(74) *Attorney, Agent, or Firm*—Tarolli, Sundheim, Covell & Tummino LLP (57) ABSTRACT

There is provided a resonance transducer including a main bridge linked with an input signal. The resonance transducer includes a transformer assembly across which an output signal can be tapped, a resonance circuit and a control circuit. In this arrangement, the transformer assembly is linked with the main bridge and the resonance circuit, the resonance circuit is further linked with the main bridge and the control circuit, and the control circuit is further linked with the main bridge.

17 Claims, 7 Drawing Sheets

RESONANCE TRANSDUCER

FIELD OF THE INVENTION

The invention relates to a resonance transducer, in particular a triggering of the resonance transducer as well as to a power supply including a resonance transducer according to the invention.

A resonance transducer usually has two input terminals for applying an input voltage, two output terminals for providing an output voltage, and a resonance circuit which can be connected to the input voltage according to the timing of its resonance frequency. The coil/inductor of the resonance cicuit is inductively coupled to a further indcutor which is linked with two output terminals through a rectifier circuit.

From [1] there is known a resonant converter in which predefined separate voltages can be provided across at least two output points which are adapted to deliver power rates of differing values.

From [2] there is likewise a resonant coverter. Here, and error signal in the converter output signal is used to have an effect on the input signal of the resonant converter by means of a voltage-controlled oscillator (VCO).

In [3] there is described a switched mode power supply including a resonance transducer, while an as constant an output signal as possible is to be made available with the resonance transducer. To this end, there is used a noise shaping filter (NSF) in the feedback branch.

BACKGROUND OF THE INVENTION

The resonance transducers known from prior art have the disadvantage that the output voltage of the secondary circuit is proportional to the input voltage of the resonance transducer and is predefined to a large extent by the turns ratio of the two coils in the resonance transducer. Further, controlling the circuits described e.g. in [2] is inefficient, because the resonance current flows through all the switching elements which accordingly have to be designed in order to perform in a powerful manner.

SUMMARY OF THE INVENTION

The object of the invention is to provide a resonance transducer which allows a controlling of the output voltage, while such controlling of the output voltage is efficient and possible without the elaborative use of expensive components. It is further an object of the invention to provide for a possibility of an efficient triggering of the resonance transducer and, finally, a switched mode power supply including a resonance transducer according to the invention.

This object is achieved according to the features of the independent claims. Further developments of the invention will be apparent from the dependent claims.

For achieving the object there is provided a resonance transducer including a main bridge linked with an input signal. The resonance transducer includes a transformer assembly accross which an output signal can be tapped, a resonance circuit and a control circuit. In this arrangement, the transformer assembly is linked with the main bridge and the resonance circuit, the resonance circuit is futher linked with the main bridge and the control circuit and the control circuit is further linked with the main bridge.

It is preferred that the input signal is configured so as to be looped through the main bridge, so that the input signal—in addition to being linked with the main bridge—is also linked with the resonance circuit and the control circuit.

Here it should be noted that the output signal can be tapped across the transformer assembly, it preferably being rectified and smoothed downstream of the transformer assembly. The transfomer assembly accordingly allows to deliver the output signal which depending on the respective requirements is made available in particular as a smoothed voltage, for instance.

A further development is that the main bridge comprises a first switch and a second switch which are provided in series connection. It is preferred that the ends of the series-connected first and second switches, i.e. the ends of the series connection made up of the first and second switches, are linked with the input signal and the resonance circuit. Optionally, a middle between the series-signal and the resonance switches, i.e. the middle of the series connection made up of the first and second switches, is linked with the tranformer assembly.

Another further development comprises at least on of the first and second switches being an electronic switch.

It is also a further development that the control circuit comprises a control bridge. The control bridge can in particular comprise a third switch and a fourth switch, with these third and fourth switches optionally being provided in series connection.

Further, a possible embodiment is that the ends of the series-connected third and fourth switches (i.e. the ends of the series connection made up of the third and fourth switches) are linked with the main bridge and the resonance circuit.

As and option, the middle between the series-connected third and fourth switches (i.e. the middle of the series connections between the third switch and the fourth switch) may be linked with the resonance circuit through a control choke.

Another further development is that at least one of the third and fourth switches is an electronic switch.

In such an arrangement, at least one of the electronic switches, i.e. for instance the first, second, third or fourth switch, can be a transistor, a MOSFET, a thyristor or an IGBT. Further, any combination of different switches is possible, e.g. not all switches have to be of the same kind or type.

A further design is that a free-wheeling diode is arranged parallel to a switch, in particular an electronic switch. It is preferred that such a free-wheeling diode is already integrated (e.g. with MOSFETs); the free-wheeling diode should additionally be provided in particular in conventional transistors, for instance.

There is a further development that the transformer assembly comprises at least on inductor, prefereably at least on transformer and/or a primary circuit and a secondary circuit. The primary circuit preferably is arranged between the main bridge and the resonance circuit. The output signal can further be tapped across the secondary circuit.

One further development is that the resonance comprises at least one inductor and/or at least one capacitor. It is preferred that the resonance circuit comprises one inductor and one capacitor.

In a further prefrerred embodiment the resonance circuit has two series-connected capacitory. In this arrangement, the ends of the series-connected capacitors, i.e. the ends of the series connection made up of the two capacitors, may each be linked with the maine bridge and the control circuit. Prefereably, i.e. in case the main bridge is designed such that the input signal linked therewith is looped through it. the ends o the series-connected capacitors may be linked with the input signal, i.e. in this case the input signal would then additionally be applied to the series connection of the two capacitors.

Another further development is that a middle of the series connection of the two capacitors is linked with the transformer assembly through a resonance choke. Further, the middle likewise may be linked with the control circuit.

An alternative embodiment is that each input signal is linked with the main bridge, the resonance circuit and the control circuit.

It is preferred that the input signal is smoothed by means of at least one input capacitor.

A further development is that the input is an input voltage and/or the output signal is an output voltage.

Another further development is that the output signal downstream of the transformer assembly is rectified by means of at least one diode and preferably is smoothed with at least one output capacitor. Here, various rectifier arrangements can be provided, for instance a rectifier bridge circuit or the like, which especially establish and appropriate smoothing of the rectified signal.

Further, for achieving the object there is provided a method of controlling or triggering a resonance transducer, in which triggering the control circuit of the resonance transducer will not occur in a first definable range.

In such arrangement, the resonance transducer is in particular configured as described above. In case the ration between output voltage and input voltage is to remain unchanged, the control circuit can stay inactive, i.e. a triggering of the control bridge and in particular of the third and fourth switches will not occur. Due to this, there won't be generated any additional control losses in this mode of operation.

An alternative embodiment of the triggering of the control circuit is that a voltage curve between the first switch and the second switch is elevated, for instance, is measured. The third switch will preferably be switched off preferably simultaneously with a rising voltage edge of the (evaluated) voltage curve. As an option, the third switch can be switchd on (in terms of time) preferably prior to a rising voltage edge of the voltage curve. It is preferred that the fourth switch may be switched off preferably simultaneously with a descending voltage edge of the voltage curve. Further, the fourth switch can be switched on (in terms of time) preferably prior to a descending voltage edge of the voltage curve.

The earlier it happens that the third and fourth switches are switched on in the interval provided for that purpose, the stronger the forward automatic gain control of the resonance transducer is, i.e the larger the voltage ratio between output signal and input signal will be. Thus, the triggering described is suitable for increasing the output voltage of the resonance transducer.

Another alternative is a reverse automatic gain control, i.e. in the reduction of the voltage ratio between output signal and input signal, this serving to reduce the output voltage of the resonance transducer.

Regarding this aspect, it will be preferred that the voltage curve between the first and the second switch is evaluated (measured, for instance). Thereupon the third switch can be switched off preferably simultaneously with a descending voltage edge of the voltage curve. It is preferred that the third switch is switched on (in terms of time) preferably prior to a descending voltage edge of the voltage curve. In addition to this, the fourth switch can be switched off preferably simulataneously with a rising voltage edge of the voltage curve and preferably be switched on (in terms of time) preferably prior to a rising voltage edge of the voltage curve.

As a solution, there further is provided an energy system, in particular a power supply, and especially a switched mode power supply comprising a resonance transducer as described herein. Such resonance transducer in the switched mode power supply is preferably operated as is described.

BRIEF DESCRIPTION OF THE DRAWINGS

Embodiments of the invention will be illustrated and explained in the following on the basis of the drawings in which.

DESCRIPTION OF EXAMPLE EMBODIMENTS

Figure 1:
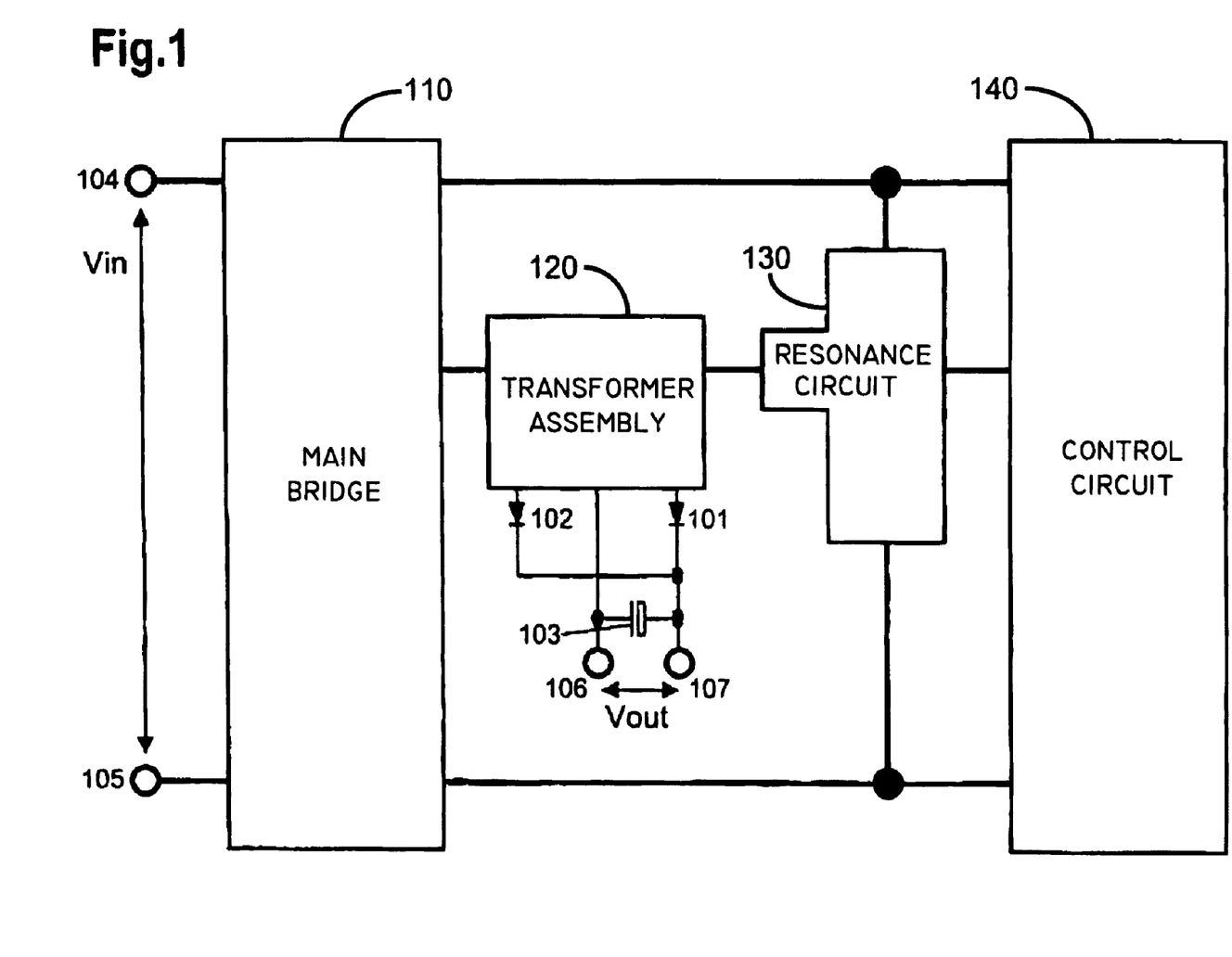
FIG. 1 is a block diagram of the resonance transducer.

In FIG. 1 there is shown a block diagram of a resonance transducer. Here, an input signal Vin is linked with a main bridge 110 through inputs 104 and 105. The inputs 104 and 105 can be configured as input terminals, connectors or pins, for example. Input 105 preferably may be at ground potential, so that in particular input 104 receives the input signal +/−Vin (with regard to ground potential).

The main bridge 110 further is connected to a transformer assembly 120, a resonance circuit 130 and a control circuit 140. The input voltage Vin, being active on the inputs 104 and 105, can preferably be looped through the main bridge 110 and be linked with the resonance circuit 130 and the control 140 as input signal Vin.

The transformer assembly 120 further is linked with the resonance circuit 130. At the output side, an output signal Vout can be tapped across the transformer assebmly 120. It is preferred that the output singal Vout is rectified and smoothed downstream of the transformer assembly 120. Exemplarily, two diodes 101 and 102 for rectification are shown in FIG. 1, and an output capacitor 103 lies parallel to the output signal Vout. The output capacitor 103 preferably is configured as an electrolytic capacitor (ELKO). The output signal Vout is made available via outputs 106 and 107, with output 107 preferably having a positive potential with regard to output 106.

Instead of the two diodes 102 and 103 there can also be chosen other rectifiers, for instance MOSFETs. Not in the concluding sense, it is referred to the possible use of a bridge rectifier.

The resonance circuit 130 further is linked with the transformer assembly 120 and the control circuit 140.

Figure 2:
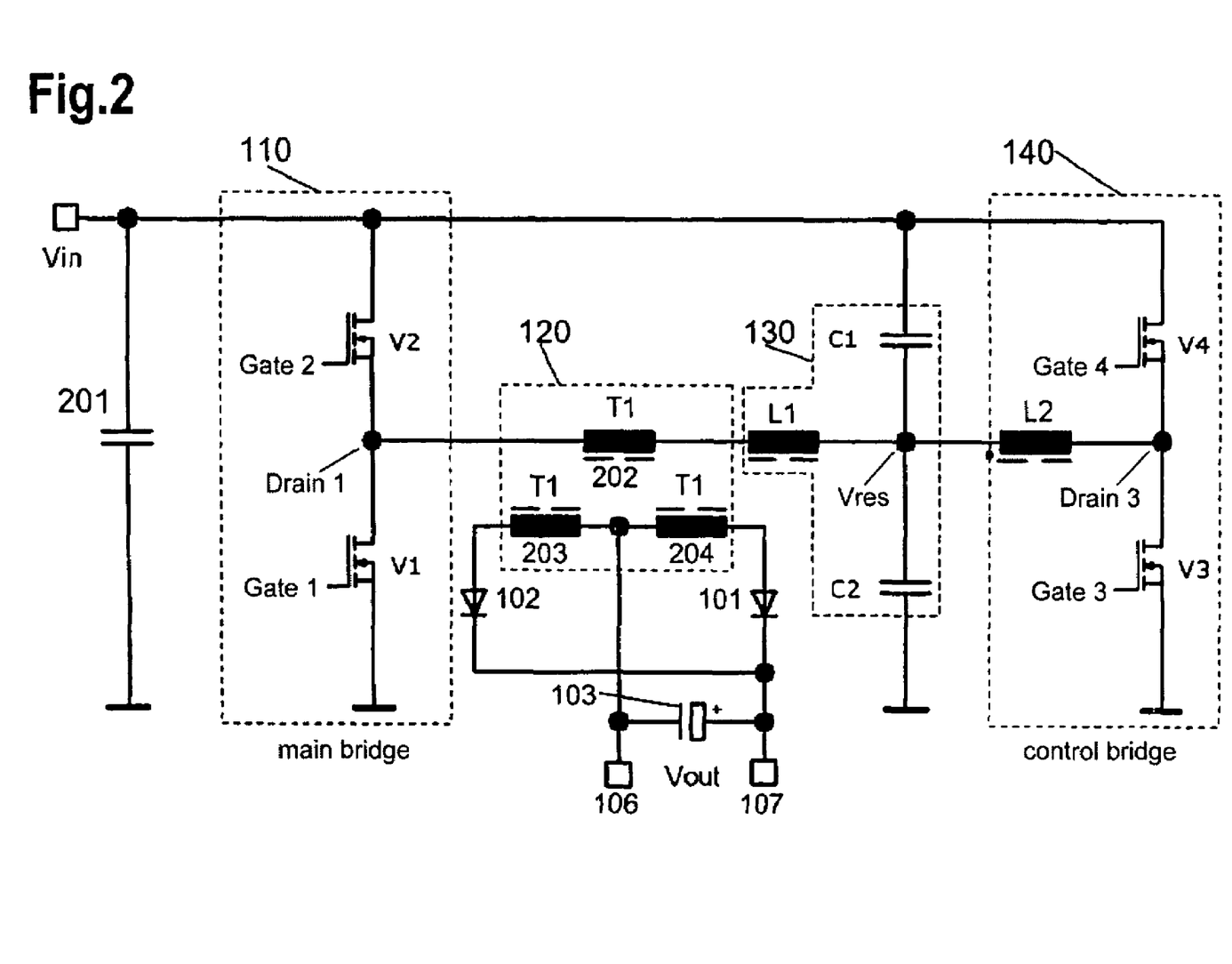
FIG. 2 shows a circuitry of the resonance transducer.

A detailed circuitry of the individual components 110, 120, 130 and 140, in particular their cooperation, is exemplarily illustrated in FIG. 2.

In FIG. 2 the input signal Vin is active via the inputs 104 and 105 such that input 105 has grond potential and input 104 has potential Vin. An input capacitor 201 may be arranged in parallel to the input signal Vin.

The main bridge 110 is arranged in parallel to the input signal Vin, with a first MOSFET V1 and a second MOSFET V2 being provided in series connection between input 10 and input 105 (here: ground potential). The MOSFET is an example of an electronic switch, while as an alternative other switches, in particular other electronic switches such as IGBTs or transistors, can be used, as well.

In FIG. 2 all electronic switches are configured as n-channel enhancement-MOSFETs. In the following, the connectors of the respective MOSFET will be designated as gate connector, S-connector for "source" and D-connector for "drain".

It is to be noted that a free-wheeling diode can basically be provided in parallel to each of the electronic switches. This, however, can be omitted with many electronic switches in which such a free-wheeling diode is already integrated (for instance with MOSFETs). Basically, it is also possible that capacitors are arranged in parallel to the electronic switches in order to reduce the speed of the voltage reversal.

The series connection made up the first MOSFET V1 and the second MOSFET V2 links the two electronic switches V1 and V2 in such a manner that the S-connector of the first MOSFET V1 is linked with the ground potential (namely input 105 of input signal Vin). The D-connector of the first MOSFET V1 in linked with the S-connector of the second MOSFET V2 and the D-connector of the second MOSFET V2 is linked with input 104 of the input signal Vin. The middle between the two electronic switches V1 and V2 is reference by "Drain1".

The transformer assembly 120 comprises a transformer T1 made up of a primary side coil 202 and two secondary side coils 203 and 204. The secondary side coils 203 and 204 are provided in series connection, and the middle between the coils 203 and 204 is designated as output 106 of the output signal Vout. The ends of the series connection made up of the two secondary side coils 203 and 204 are each connected to the anode of diode 102 (linked with coil 203) and to the anode of diode 101 (linked with coil 204); the cathodes of the diodes 101 and 102 being linked with each other as well as with connector 107. Thus, the output signal Vout can be tapped across the connectors 106 and 107, with an electrolytic capacitor 103 being arranged in parallel to the connectors 106 and 107 and having its positive charge connection linked with connector 107.

The middle between teh first MOSFET V1 and the second MOSFET V2, namely "Drain1", is linked with the transformer assebmly 120, in fact with one end of the primary side coil 202.

The other end of the primary side coil 202 is linked with the resonance circuit 130, in fact with the one end of a resonance choke L1. The other end of the resonance choke L1 is linked with the middle Vres of a series connection made up of a first resonance capacitor C1 and a second resonance capacitor C2. The other end of the first resonance capacitor C1 is linked with connector 104 and the other end of the resonance cpacitor C2 is linked with connector 105 (i.e. with ground potential) of teh input signal Vin. As an alternative, one of the two capacitors may also be omitted. Further, the resonance choke L1 can also be formed by the stray inductance of the transformer.

The middle Vres between the two resonance capacitors C1 and C2 is linked with the control circuit 140, actually with the one end of a control choke L2. In FIG. 2 the control circuit 140 is configured as a control bridge made up of two electronic switches, here of two n-channel enhancement MOSFETs V3 and V4. The same what has been said regarding the wo MOSFETs V1 and V2 also applies to the designations of the MOSFETs V3 and V4.

The third MOSFET V3 and the fourth MOSFET V4 are provided in series connection such that the S-connector of the third MOSFET V3 is linked with the connector 104 of the input signal Vin.

Here it should be noted that teh input signal Vin and the output signal Vout preferably are an input voltage and an output voltage, respectively.

Figure 3:
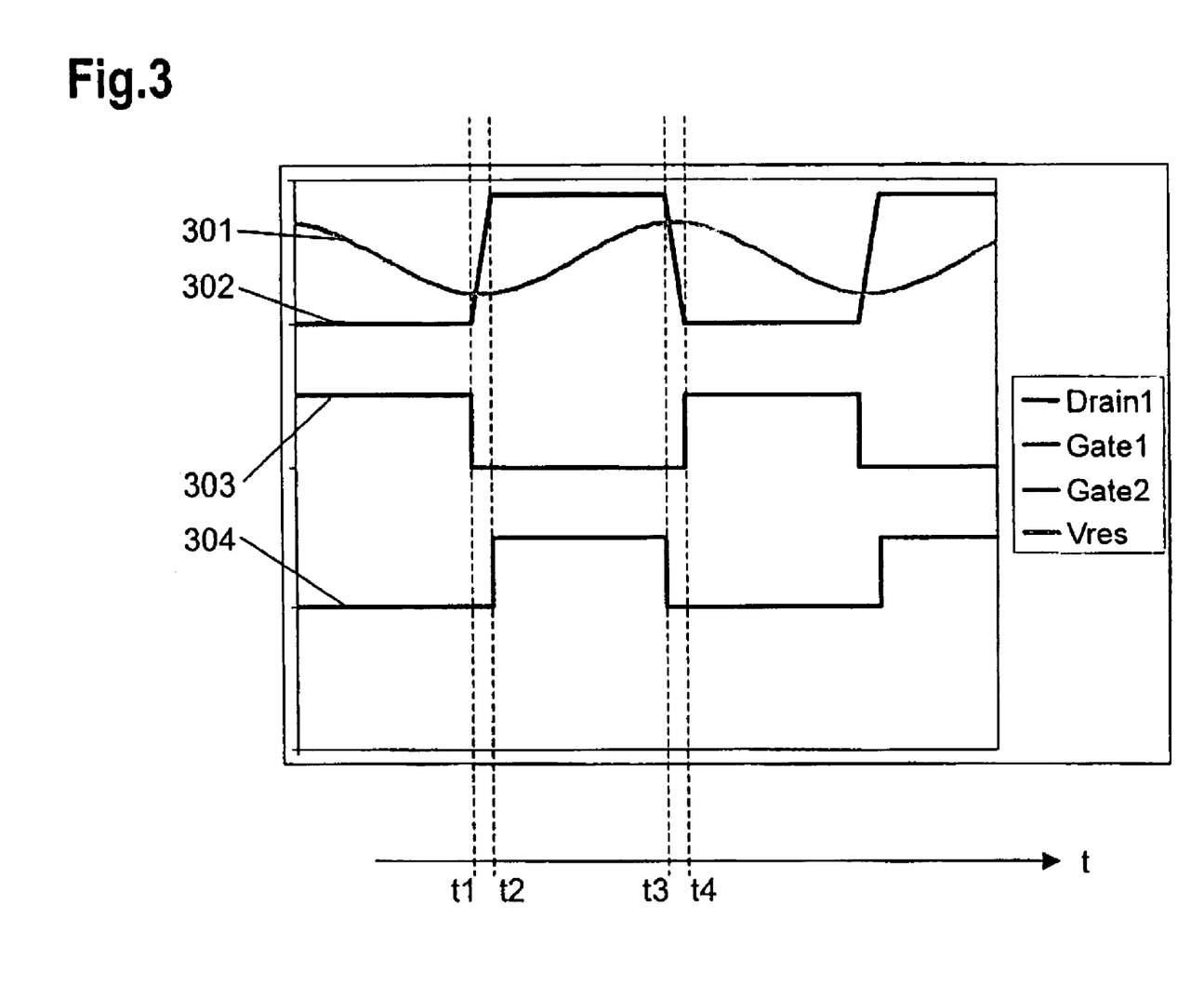
FIG. 3 is a time diagram illustrating the triggering of the main bridge of the resonance transducer.

FIG. 3 depicts a time diagram illustrating the triggering of the main brdige of the resonance transducer.

As described in FIG. 2, the main bridge 110 of the resonance transducer includes the electric switches V1 and V2, which are linked with the resonance capacitors C1 and C2 through the transformer T1 (primary side coil 202 and secondary side coils 203 and 204) and the resonance choke L1. At this point, namely in the middle Vres between teh wo resonance capacitors C1 and C2, there will arise an essentially sinusoidal resonance voltage 301.

The first MOSFET V1 and the second MOSFET V2 commutate alernatingly, usually with a short trigger pause for the reversing of the voltage at "Drain1", i.e. at the middle of the series connection made up of the first and second MOSFETs V1 and V2. FIG. 2 illustrates a characteristic curve 303 for the triggering of the first MOSFET V1 and a characteristic curve 304 for the triggering of the second MOSFET V2.

As a general rule, triggering a MOSFET is performed vial the gate connector thereof, i.e. an externaol triggering circuitry provides, for example, for a voltage curve at the gate connector of the respective MOSFET as a function of other characteristic variables of the circuitry concerned.

Resulting from the triggering of the first MOSFET V1 according to characteristic curve 303 and the triggering of the second MOSFET V2 according to characteristic curve 304, there will be a voltage a curve at "Drain1" according to the characteristic curve 302 in the present case (circuitry according to FIG. 2).

At an instant t1, the first MOSFET V1 turns "off" (see characteristic curve 303), the voltage curve 302 rises. At an instant t2, the second MOSFET V2 turns "on" (see characteristic surve 304), the voltage curve 302 remains virtually unchanged at a high potential until the second MOSFET V2 (characteristic curve 304) turns "off" at a following instant t3. Now the voltage at "Drain1" (see characteristic curve 302) lowers, until at an instant t4 the first MOSFET goes to "on", involving that the voltage at "Drain1" remains virtually unchanged at a low potential.

The voltage curve 301 in the middle Vres is essentially sinusoidal, and the voltage curve 302 at "Drain1" is out of phase to this by 90°.

Disregarding the voltage drops in the circuitry, the output voltage Vout of the resonance transducer amounts to:

$$Vout = Vin/(2*ue) \quad (1)$$

with $$ue = n_{prim}/n_{sek} \quad (2)$$

follows:

Vout is porportional to Vin wherein ue designates a transformer transmission ratio;

$n_{prim}$ designates a number of windings in the primary circuit of the transformer; and $n_{sek}$ designates a number of windings in teh secondary circuit of the transformer.

By manipluation of the waveform and/or of the amplitude of the voltage curve at the middle Vres (see characteristic curve 301) by means of the control circuit 140, the otherwise fixed and predefined ratio of Vout/Vin can be adjusted within specific limits. So it is possible to achieve, for instance, and output voltage Vout which is constant throughout a specific range of the input voltage Vin.

As to the controlling process, there has to be differentiated especially between three cases:
  neutral range: Vout/Vin remains unchanged according to formula (1);
  forward automatic gain control: Vout/Vin increases;
  reverse automatic gain control: Vout/Vin decreases;

A maximum forward automatic gain control is achieved, for instance, if:
  the voltage curve at point "Drain1" is in-phase with the voltage curve at point "Drain3";
  the voltage curve at the gate connector of th first MOSFET V1 is equal in particular to the voltage curve at the gat connector of the third MOSFET V3 and, in addition, the voltage curve at teh gate connector of the second MOSFET V2 is equal in particular to the voltage curve at the gate connector of the fourth MOSFET V4, i.e. $U_{Gate1}=U_{Gate3}$ and $U_{Gate2}=U_{Gate4}$.

A maximum reverse automatic gain control is achieved, for instance, if:
  the voltage curve at point "Drain1" is in opposition with the voltage curve at point "Drain3";
  the voltage curve at the gate connector of the first MOSFET V1 is equal in particual to the voltage curve at the gate connector of the fourth MOSFET V4 and, in addition, the voltage curve at the gate connector of the second MOSFET V2 is equal in particular to the voltage curve at the gate connector of the third MOSFET V3, i.e. $U_{Gate1}=U_{Gate4}$ and $U_{Gate2}=U_{Gate3}$.

The range between the maximum reverse automatic gain control and the maximum forward automatic gain control can be effected by a phase shift of the voltage at point "Drain3" with respect to the voltage at point "Drain1" (both leading and lagging in time). The control losses and a large alteration of the resonance frequency in the region of a low-level forward or reverse automatic gain control, even with a smaill load, represent disadvantages here. An improved embodiment will be explained below.

It is preferred that is the above-mentioned "neutral range", i.e. in the case where the ratio Vout/Vin hss to be kept up with according to formula (1), any additional controlling by the control circuit 140 will not occur. It is true in particular for this neutral range that the control circuit willnot be triggered in order to avoid any additional losses.

If, however, there is to be achieved a reverse or forward automatic gain control, it is particular the control bridge which is triggered through the third MOSFET V3 and the fourth MOSFET V4, such triggering lasting only as long as necessary. In doing so, the current in the control choke L2 is reduced as compared with a controlling process including a phase shift, resulting in a diminishment of the losses due to the control circuit 140.

With this type of triggering the control circuit 140 pause periods preferably will arise during which neither the third MOSFET V3 nor the fourth MOSFET V4 are triggered.

Figure 4A:
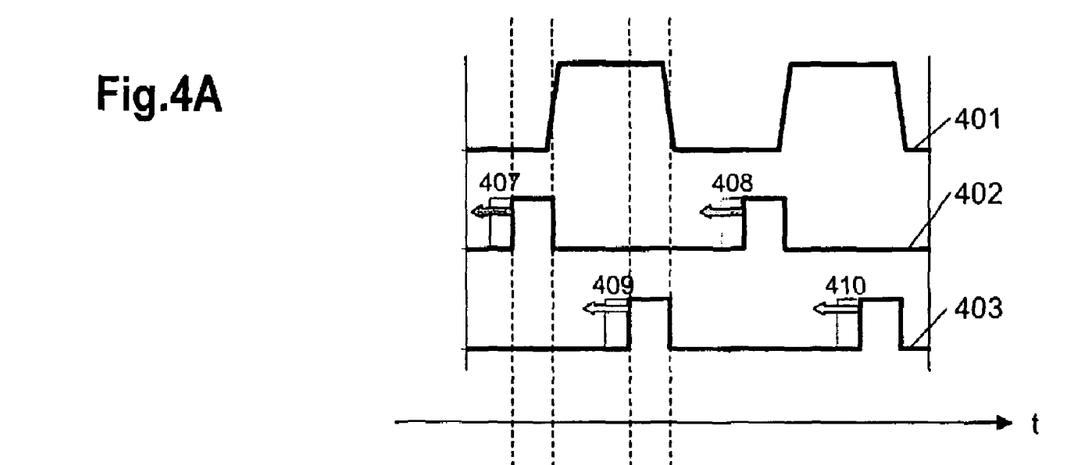
FIG. 4 is a time diagram illustrating the triggering for performing a forward automatic gain control (FIG. 4A) and a reverse automatic gain control (FIG. 4B) of the control bridge of the resonance transducer.
Figure 4B:
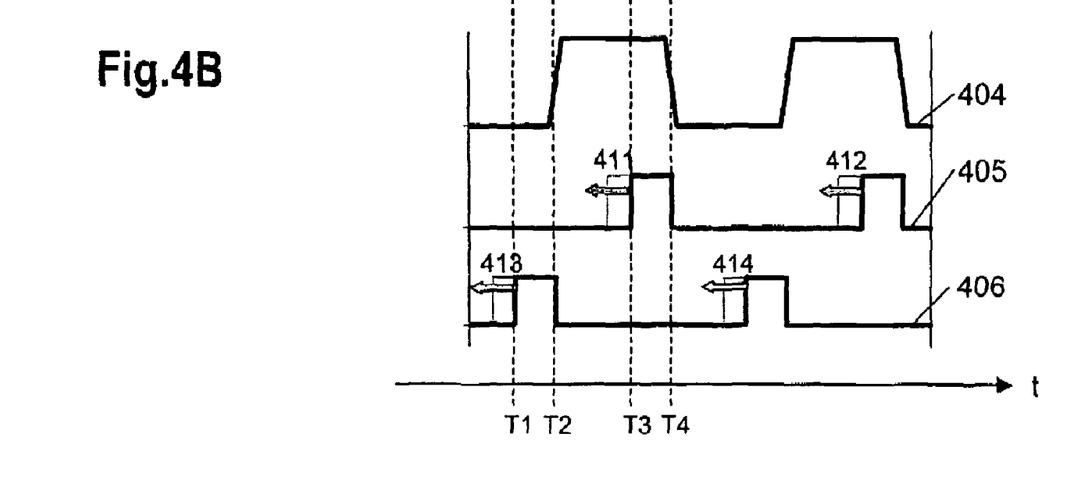

FIG. 4 shows a time diagram illustrating the triggering for performing a forward automatic gain control (FIG. 4A) and a reverse automatic gain control (FIG. 4B) of the control bridge of the resonance transducer.

In both cases, forward automatic gain control (FIG. 4A) as well as reverse automatic gain control (FIG. 4B), it is of particular advantage if switching off the third MOSFET V3 and the fourth MOSFET V4 occurs in particular simultaneously or essentially simulitaneously with the voltage edge of the voltage curve at point "Drain1", in order to thus minimize the reactive current in the control system in an advantageous manner.

FIG. 4A shows the case of the forward automatic gain control. The voltage curve 401 at the point "Drain1" of the circuitry according to FIG. 2 is compared with the voltage curve 402 for triggering the third MOSFET V3 through its gate connector as well as with the voltage curve 403 for triggering the fourth MOSFET V4 through its gate connector.

The third MOSFET V3 is switched off here at an instant T2 which is essentially simultaneously with a risting voltage edge of the voltage curve 401. It is preferred that the third MOSFET V3 is switched on at an instant T1 prior to a rising voltage edge of the voltage curve 401.

The switch-on moment of the third MOSFET V3 is variable in time with regard to the breakover points of the main bridge (e.g. at point "Drain1", illustrated by voltage curve 401). it is by means of the switching moment that the quantity of the alteration Vout/Vin is adjusted, the latter being enforced by the controlling process. In FIG. 4A, the variable switching moment for switching on the third MOSFET V3 is represented by arrows 407 and 408, and for switching on the fourth MOSFET V4 by the arrows 409 and 410. It occurs in particular simultaneously with a descending voltage edge of voltage curve 401 that the fourth MOSFET V4 is switched off at an instant T4. It is preferred that the fourth MOSFET V4 is switched on prior to a descending voltage edge of voltage curve 401 at an instant T3.

FIG. 4B shows the case of the reverse automatic gain control. The voltage curve 404 is equal to the voltage curve 401 of FIG. 4A at point "Drain1" of the circuitry according to FIG. 2. Compared with the voltage curve 404 are the voltage curve 405 for triggering the third MOSFET V3 through its gate connector as well as the voltage curve 406 for triggering the fourth MOSFET V4 though its gate connector.

The third MOSFET V3 is switched off here at an instant T4, essentially simultaneously with a descending voltage edge of voltage curve 404 or in particular exactly simultaneously therewith. It is preferred that the third MOSFET V3 is switched on at an instant T3 prior to a descending voltage edge of voltage curve 404.

This switch-on moment of the third MOSFET V3 is variable in time with regard to the breakover points of teh main bridge (e.g. at point "Drain1", illustrated by voltage curve 404). It is by means of the switching moment that the quantity of the alteration Vout/Vin is adjusted, the latter being enforced by the controlling process. In FIG. 4B, the variable switching moment for switching on the third MOSFET V3 is represented by the arrows 411 and 412, and for switching on the fourth MOSFET V4 by the arrows 413 and 414.

It occurs in particular simultaneously witha rising voltage edge of voltage curve 404 that the fourth MOSFET V4 is switched off at an instant T2. It is preferred that the fourth MOSFET V4 is switched on prior to a rising voltage edge of voltage curve 404 at an instant T1.

It will be preferred that no triggering pulses of the gate connectors of the third MOSFET V3 and/or fourth MOSFET V4 are present in the neutral range.

Figure 5:
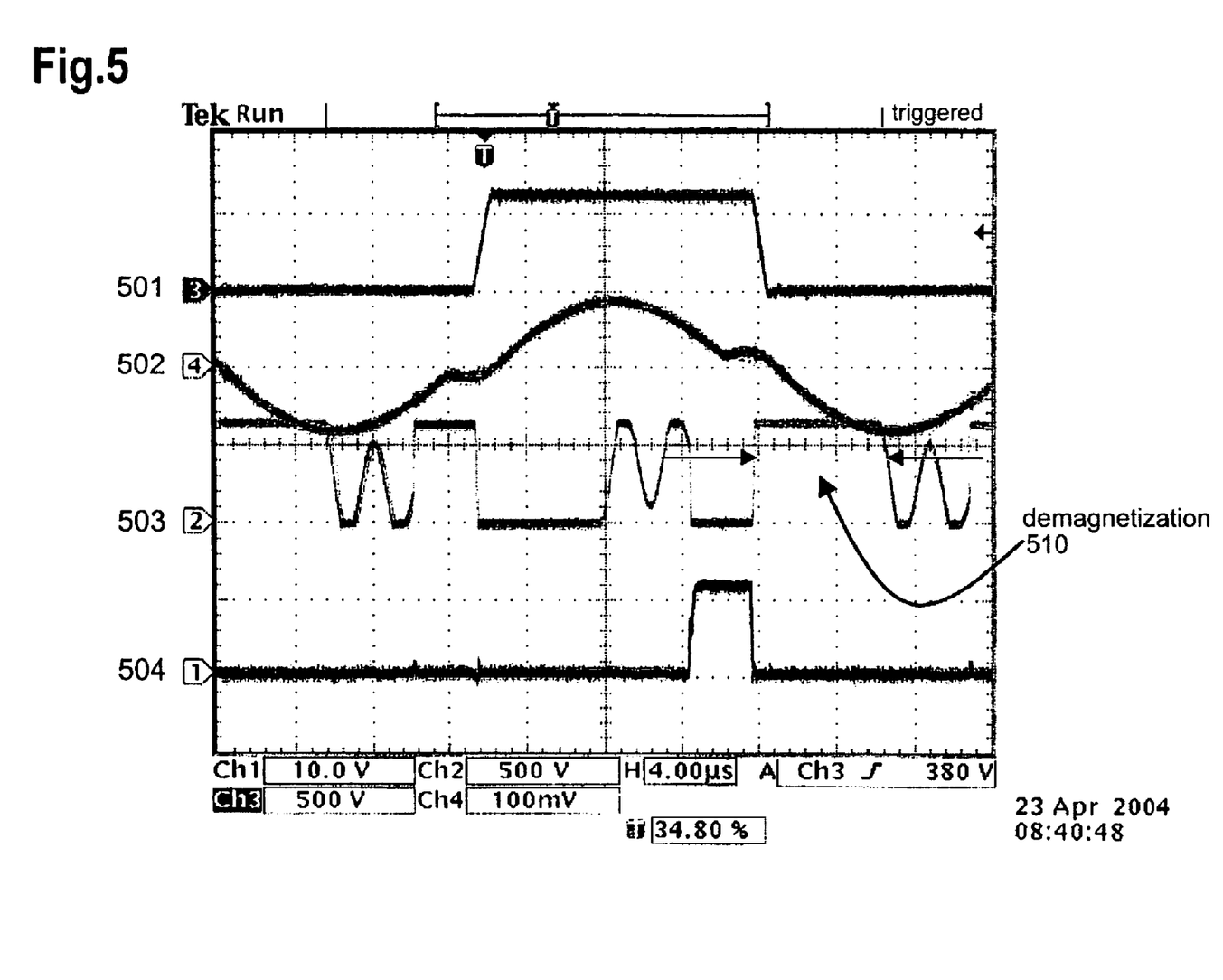
FIG. 5 shows an oscillogram illustrating the reverse automatic gain control.

FIG. 5 shows an oscillogram illustrating the mode of operation of the reverse automatic gain control. To this end, FIG. 5 shows a voltage curve 501 in the point "Drain1" between the first MOSFET V1 and ateh second MOSFET V2, a current curve 502 through the resonance choke L1, a voltage courve 503 in the point "Drain3" between the third MOSFET V3 and the fourth MOSFET V4, and a voltage curve 504 at the gate connector of the third MOSFET V3.

After deactivating the gate pulse at the third MOSFET V3, i.e. after the falling edge in voltage curve 504, the voltage curve 503 shows a reversing to the level of the input voltage. The voltage remains at this level until the control choke L2 is demagnetized and the current through it has faded out. During such demagnetization 510, the current flows in the reverse direction through the fourth MOSFET V4 via its body diode. As an alternative and/or in addition it would also be possible to trigger the fourth MOSFET V4 during this period in order to relieve the body diode. This applies correspondingly to all the switches of the resonance transducer described.

The time span which is needed by the control choke L2 for demagnetization 510 is in particular dependent on the duration on teh duration of the voltage pulse at the gate connector of the third MOSFET V3 and the voltage across the control choke L2. Here, the voltage across the control choke L2 is also influenced by the output current.

Figure 6:
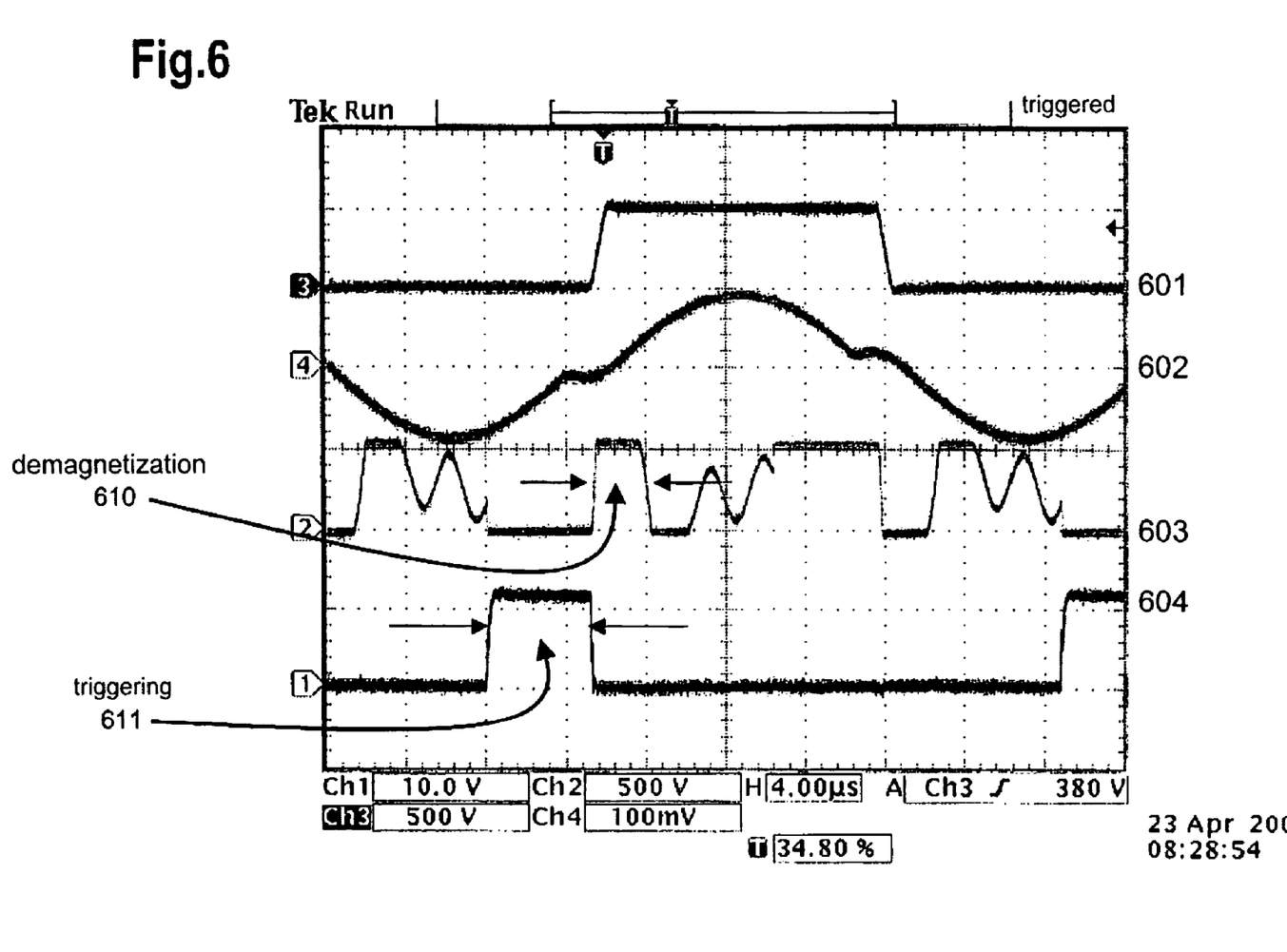
FIG. 6 shows an oscillogram illustrating the forward automatic gain control.

FIG. 6 an oscillogram illustrating the mode of operation of the forward automatic gain control. To this end, FIG 6. shows a voltage curve 601 in the point "Drain1" between the first MOSFET V1 and the second MOSFET V2, a current curve 602 through the resonance choke L1, a voltage curve 603 in the point "Drain3" between the third MOSFET V3 and the fourth MOSFET V4, and a voltage curve 604 at the gate connector of the third MOSFET V3.

Without any load, the duration of a demagnetization 610 is in particular equal to the duration of a triggering pulse 611. With high load, demagnetization 610 occurs within a shorter time in the case of the forward automatic gain control, and needs more time in the case of the reverse automatic gain control. This is due to the ripple content at the resonance capacitor(s) which increases with the load.

It is preferred that the oscillations in voltage curve 603 can be damped in the pauses with an additional RC element.

With a longer lasting triggering process 611 (broader triggering pulse), triggering 611 and demagnetization 610 will meet or overlap. In the case there will be no more pause(s).

Here is should be noted that the control range is a function of the dimension of the control choke L2: The lower the inductance of L2, the larger the control range will be.

The resonance transducer which has been described can be use at advantage in the mode of operation or triggering described above, in a current supply system, in particular in a power supply or a switched mode power supply. It is preferred that a constant output voltage is influenced by the control circuit 140 or—by a forward or reverse automatic gain control—is modified within specific limits around the neutral range described above.

Figure 7:
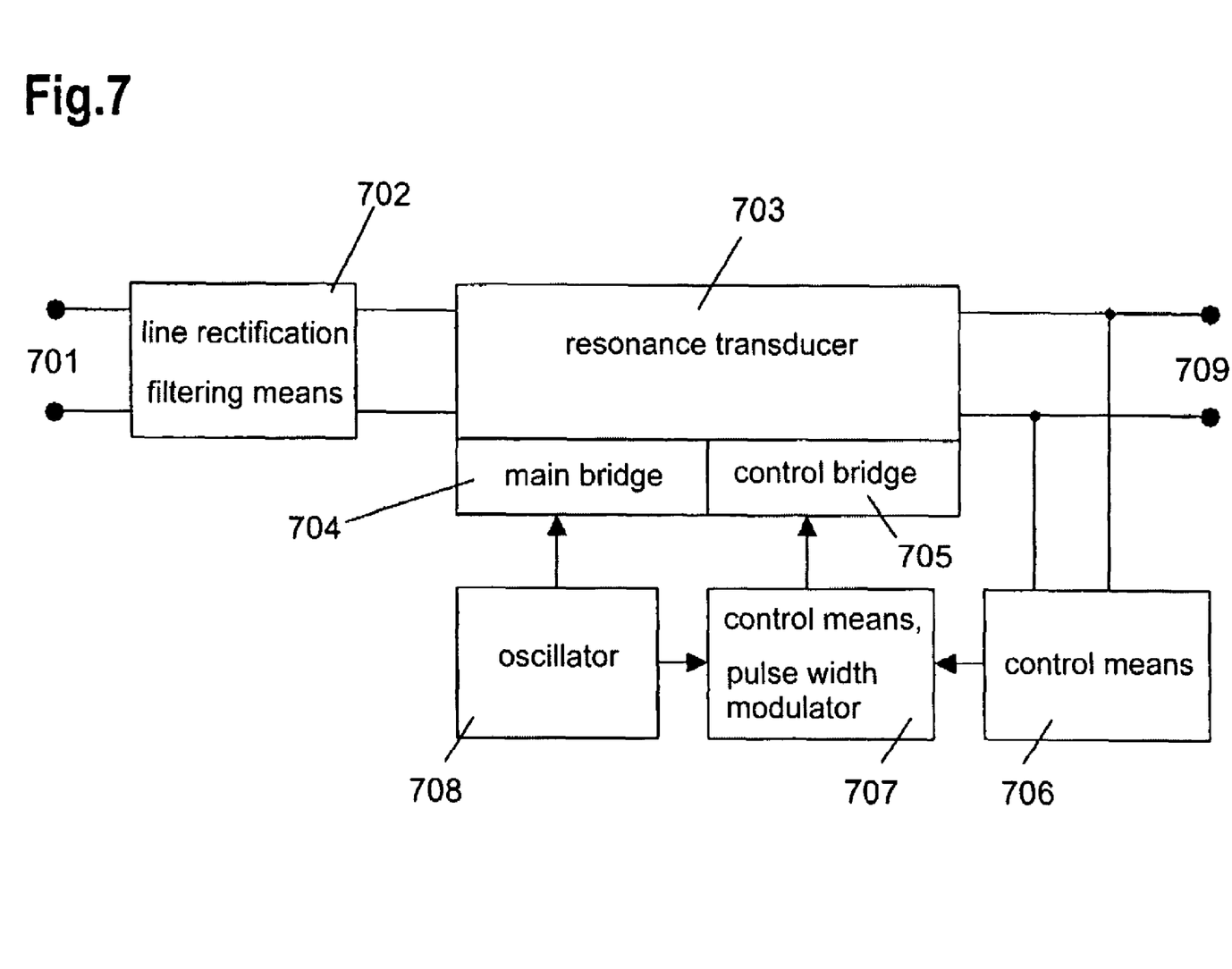
FIG. 7 is a block diagram of a switched mode power supply including a resonance transducer.

FIG. 7 shows a bolck diagram of a switched mode power supply comprising a resonance transducer. In this case, and input signal 701 is converted to an output signal 709; it is preferred that an alternating voltage is converted to a controlled direct voltage. The input signal 701 is delivered to a module 702 including a line rectification and a filtering means. The output signal of the module 702 is delivered to a resonance transducer 703 comprising a main bridge 704 and a control bridge 705. The output signal of teh resonance transducer 703 is the output signal 709, with this outpus signal being delivered to a control means 706. The signal gained by the control means 706 is delivered to a control means or pulse width modulation 707, with an output signal of the control means or pulse width modulation having an effect on the control bridge 705 of the resonance transducer 703. Additionally an oscillator 708 is provided which makes available a signal both for control mans or pulse width modulation 707 and the main bridge 704 of the resonance transducer 703.

The invention claimed is:

1. A method of controlling or triggering a resonance transducer,
comprising a main bridge (110) linked with an input signal (Vin),
comprising a transformer assembly (120) across which an output signal (Vout) can be tapped,
comprising a resonance circuit (130),
comprising a control circuit (140),
the transformer assembly (120) being linked with the main bridge (110) and the resonance circuit (130),
the resonance circuit (130) further being linked with the main bridge (110) and the control circuit (140),
the control circuit (140) further being linked with the main bridge (110),
wherein triggering the control circuit (140) will not occur in a first definable, and
wherein the control circuit (140) stays inactive in case the ratio between output voltage and input voltage is to remain unchanged.

2. A method of controlling or triggering a resonance transducer
comprising a main bridge (110) linked with an input signal (Vin),
comprising a transformer assembly (120) across which an output signal (Vout) can be tapped,
comprising a resonance circuit (130),
comprising a control circuit (140),
the transformer assembly (120) being linked with the main bridge (110) and the resonance circuit (130),
the resonance circuit (130) further being linked with the main bridge (110) and the control circuit (140),
the control circuit (140) further being linked with the main bridge (110),
the main bridge (110) comprises a first switch (V1) and a second switch (V2) which are provided in series connection,
wherein the control circuit (140) comprises a control bridge,
wherein the control bridge comprises a third switch (V3) and a fourth switch (V4) which are provided in series connection,
wherein the method comprises the steps:
a voltage curve (Drain 1) between the first switch (V1) and the second switch (V2) is evaluated, and
the third switch (V3) is switched off substantially simultaneously with a rising voltage edge of the voltage curve (Drain1).

3. The method according to claim 2, wherein the third switch (V3) is switched on prior to a rising voltage edge of the voltage curve (Drain1).

4. The method according to claim 2, wherein the fourth switch (V4) is switched off substantially simultaneously with a descending voltage edge of the voltage curve (Drain1).

5. The method according to claim 2, wherein the fourth switch (V4) is switched on prior to a descending voltage edge of the voltage curve (Drain1).

6. The method according to claim 2, for performing a forward automatic gain control of the voltage ratio between the output signal (Vout) and the input signal (Vin).

7. A method of controlling or triggering a resonance transducer
comrrising a main bridge (110) linked with an input signal (Vin), comprising a transformer assembly (120) across which an output signal (Vout) can be tapped,
comprising a resonance circuit (130),
comprising a control circuit (140),
the transformer assembly (120) being linked with the main bridge (110) and the resonance circuit (130),
the resonance circuit (130) further being linked with the main bridge (110) and the control circuit (140),
the control circuit (140) further being linked with the main bridge (110),
the main bridge (110) comprises a first switch (V1) and a second switch (V2) which are provided in series connection,
wherein the control circuit (140) comprises a control bridge,
wherein the control bridge comprises a third switch (V3) and a fourth switch (V4) which are provided in series connection,
wherein the method comprises the steps:
a voltage curve (Drain 1) between the first switch (V1) and the second switch (V2) is evaluated, and
wherein the third switch (V3) is switched off substantially simultaneously with a descending voltage edge of the voltage curve (Drain 1).

8. The method according to claim 7, wherein the third switch (V3) is switched on preferably prior to a descending voltage edge of the voltage curve (Drain1).

9. The method according to claim 7, wherein the fourth switch (V4) is switched off substantially simultaneously with a rising voltage edge of the voltage curve (Drain1).

10. The method according to claim 7, wherein the fourth switch (V4) is switched on prior to a rising voltage edge of the voltage curve (Drain1).

11. The method according to claim 7, for performing a reverse automatic gain control of the voltage ratio between the output signal (Vout) and the input signal (Vin).

12. A switched mode power supply comprising a resonance transducer
comprising a main bridge (110) linked with an input signal (Vin),
comprising a transformer assembly (120) across which an output signal (Vout) can be tapped,
comprising a resonance circuit (130),
comprising a control circuit (140),
the transformer assembly (120) being linked with the main bridge (110) and the resonance circuit (130).
the resonance circuit (130) further being linked with the main bridge (110) and the control circuit (140),
the control circuit (140) further being linked with the main bridge (110), and
which resonance transducer is operated by means of a method according to claim 1.

13. A method of controlling or triggering a resonance transducer according to claim 12.

14. A method of controlling or triggering a resonance transducer, the resonance transducer comprising:
a main bridge (110) linked with an input signal (Vin) and a control circuit (140); and
a transformer assembly (120) linked to the main bridge (110) and a resonance circuit (130), wherein a potential across the transformer assembly defines an output signal (Vout);
wherein the resonance circuit is linked with the main bridge (110) and the control circuit (140);
the method comprises the steps of:
disabling triggering of the control circuit (140) in response to the input signal (Vin) being within a first definable range, such that the control circuit (140) stays inactive thereby maintaining a ratio between output voltage and input voltage in response to the input signal (yin) being within the first definable range; and triggering the control circuit (140) in response to the input signal (Vin) being outside the first definable range, such that the control circuit (140) is activated, thereby altering the ratio between the output voltage and the input voltage in response to the input signal (Vin) being outside the first definable range.

15. A method of controlling or triggering a resonance transducer, the resonance transducer comprising:
a main bridge (110) linked with an input signal (Vin) and a control circuit (140); and
a transformer assembly (120) linked to the main bridge (110) and a resonance circuit (130), wherein a potential across the transformer assembly (120) defines an output signal (Vout);
wherein the resonance circuit is linked with the main bridge (110) and comprises the step of triggering the control circuit (140)
the method comprises the step of triggering the control circuit (140) such that the control circuit (140) is activated, thereby altering a ratio between the output voltage and the input voltage.

16. The method of claim 15, wherein the triggering of the control circuit (140) increases the ratio between the input voltage and the output voltage.

17. The method of claim 16, wherein the triggering of the control circuit (140) decreases the ratio between the input voltage and the output voltage.

* * * * *

UNITED STATES PATENT AND TRADEMARK OFFICE
CERTIFICATE OF CORRECTION

PATENT NO.         : 7,495,933 B2                                   Page 1 of 1
APPLICATION NO. : 11/185550
DATED              : February 24, 2009
INVENTOR(S)        : Heiner Friedrich and Bernd Pfeifer

It is certified that error appears in the above-identified patent and that said Letters Patent is hereby corrected as shown below:

Column 10, line 20, after "definable" insert --range--

Column 12, line 20, after "signal" delete "(yin)" and insert --(Vin)--

Signed and Sealed this

Seventh Day of April, 2009

JOHN DOLL
*Acting Director of the United States Patent and Trademark Office*